United States Patent
Yoo

(10) Patent No.: US 8,749,617 B2
(45) Date of Patent: Jun. 10, 2014

(54) DISPLAY APPARATUS, METHOD FOR PROVIDING 3D IMAGE APPLIED TO THE SAME, AND SYSTEM FOR PROVIDING 3D IMAGE

(75) Inventor: Hyo-nam Yoo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 557 days.

(21) Appl. No.: 12/979,831

(22) Filed: Dec. 28, 2010

(65) Prior Publication Data

US 2011/0187822 A1 Aug. 4, 2011

(30) Foreign Application Priority Data

Feb. 2, 2010 (KR) ........................ 10-2010-0009537

(51) Int. Cl.
*H04N 13/00* (2006.01)
*G06T 15/00* (2011.01)

(52) U.S. Cl.
USPC ............................................ 348/43; 345/419

(58) Field of Classification Search
USPC ........... 348/51, 427, 42, 420, 46, 36, 569, 43, 348/53, 56, 59, 419, 60, 44; 382/103, 115, 382/154; 345/419
See application file for complete search history.

(56) References Cited

U.S. PATENT DOCUMENTS

| | | | | |
|---|---|---|---|---|
| 2002/0158865 A1* | 10/2002 | Dye et al. | ....................... | 345/419 |
| 2008/0252578 A1* | 10/2008 | Kim et al. | ......................... | 345/87 |
| 2010/0073769 A1* | 3/2010 | Richards et al. | .............. | 359/464 |
| 2010/0091091 A1* | 4/2010 | Kim | ................................ | 348/42 |
| 2011/0012896 A1* | 1/2011 | Ji | ..................................... | 345/419 |
| 2011/0032330 A1* | 2/2011 | Kim et al. | ........................ | 348/43 |
| 2011/0102544 A1* | 5/2011 | Kim | .................................. | 348/43 |
| 2012/0127282 A1* | 5/2012 | Hwangbo | ......................... | 348/51 |
| 2013/0127990 A1* | 5/2013 | Lin et al. | .......................... | 348/43 |

FOREIGN PATENT DOCUMENTS

| | | |
|---|---|---|
| JP | 1999-75223 A | 3/1999 |
| KR | 10-0445898 A | 8/2003 |

OTHER PUBLICATIONS

Peter Wimmer, Stereoscopic Player and Stereoscopic Multiplexer, Nov. 26, 2006, 3dtv.at, 21.*

* cited by examiner

*Primary Examiner* — Behrooz Senfi
(74) *Attorney, Agent, or Firm* — Sughrue Mion, PLLC

(57) ABSTRACT

A display apparatus, a method for providing a three-dimensional (3D) image and a system for providing a 3D image are disclosed. The display apparatus determines a format of an input image if a first signal is received from 3D glasses, and displays the image currently being displayed in a two-dimensional (2D) image mode in a 3D image mode according to the determined format. Accordingly, the displays apparatus determines the format of the 3D image in response to a user wearing the 3D glasses and displays the 3D image in a 3D image mode according to the determined format. Thus, the user may enjoy the 3D image more easily and conveniently.

18 Claims, 8 Drawing Sheets

DISPLAY APPARATUS, METHOD FOR PROVIDING 3D IMAGE APPLIED TO THE SAME, AND SYSTEM FOR PROVIDING 3D IMAGE

CROSS-REFERENCE TO RELATED APPLICATION

This application claims priority from Korean Patent Application No. 10-2010-0009537, filed in the Korean Intellectual Property Office on Feb. 2, 2010, the disclosure of which is incorporated herein by reference.

BACKGROUND

1. Field

Apparatuses and methods consistent with exemplary embodiments relate to a display apparatus, a method for providing a three-dimensional (3D) image, and a system which provides a 3D image, and more particularly, to a display apparatus which alternately displays a left eye image and a right eye image, a method for providing a 3D image, and a system which provides a 3D image.

2. Description of the Related Art

Three-dimensional (3D) stereoscopic image technology is applicable to various fields such as information communication, broadcasting, medicine, education and training, military, gaming, animation, virtual reality, computer aided drafting (CAD), and industrial technology. Furthermore, 3D stereoscopic image technology is regarded as a core base technology for the next generation 3D stereoscopic multimedia information communication, which is utilized in the aforementioned fields.

Generally, a stereoscopic sense that a person perceives occurs due to various factors, including a degree of change of thickness of a person's eye lens according to a location of an object to be observed, an angle difference of the object observed from both eyes, differences of location and shape of the object observed from both eyes, a time difference due to a movement of the object, and other various psychological and memory effects.

In particular, binocular disparity, caused by about a 6 to 7 cm lateral distance between the person's left eye and right eye, can be regarded as an important cause of the stereoscopic sense. Due to binocular disparity, the person perceives the object with an angle difference, which makes the left eye and the right eye receive different images. When these two images are transmitted to the person's brain through retinas, the brain can perceive the original 3D stereoscopic image by combining the two pieces of information.

Stereoscopic image display apparatuses may be classified into two types: glasses-type apparatuses which use special glasses, and non-glasses-type apparatuses which do not use such special glasses. A glasses-type apparatus may adopt a color filtering method which separately selects images by filtering colors which are in mutually complementary relationships, a polarized filtering method which separates the images received by a left eye from those received by a right eye using a light-shading effect caused by a combination of polarized light elements meeting at right angles, or a shutter glasses method which enables a person to perceive a stereoscopic sense by alternately blocking a left eye and a right eye in response to a synchronization signal which corresponds to a projection of a left image signal and a right image signal to a screen.

A 3D image includes a left eye image perceived by the left eye and a right eye image perceived by the right eye, and a 3D stereoscopic apparatus expresses a stereoscopic image using the time difference between the left eye image and the right eye image.

There are various formats for 3D images including a side-by-side type, a top-bottom type, a frame sequence type, a horizontal interleave type, a vertical interleave type, a checker board type, etc.

A user wears 3D glasses to view a 3D image. The 3D image should be displayed only when the user wears the 3D glasses. As described above, the method for displaying a 3D image is different from that of a two-dimensional (2D) image and there exist various formats for displaying a 3D image. Thus, in order to display an input 3D image, a user should perform several manipulations such as converting to a 3D mode and setting an appropriate format. In this case, a user who is not accustomed to terms for 3D images may experience difficulty in performing such manipulations.

Therefore, a method for providing 3D images to a user to view the 3D images more conveniently is beneficial.

SUMMARY

Aspects of exemplary embodiments relate to a display apparatus which determines a format of an image if a first signal is received from three-dimensional (3D) glasses and converts a currently displayed two-dimensional (2D) image to a 3D image based on the determined format, a method for providing a 3D image, and a system which provides a 3D image.

According to an aspect of an exemplary embodiment, there is provided a display apparatus interworking with 3D glasses, the display apparatus including: an image input unit through which an image is input; a display unit which displays the input image in a 2D image mode or a 3D image mode; a glasses signal transmitting/receiving unit which receives a first signal generated by the 3D glasses from the 3D glasses; and a controlling unit which determines a format of the input image if the first signal is received, and controls the input image being displayed in the 2D image mode to be displayed in the 3D image mode according to the determined format.

The controlling unit may control the image input unit so that a graphical user interface (GUI) including a plurality of 3D image format items for selecting the format of the input image is displayed if the first signal is received.

The controlling unit may determine a format of the input 3D image automatically if the first signal is received, and highlight and display the determined 3D image format item from among the plurality of format items included in the GUI.

The 3D glasses may include a sensor which senses whether a user wears the 3D glasses and may generate the first signal if the 3D glasses sense that the user wears the 3D glasses.

The sensor may sense whether the user wears the 3D glasses according to at least one of a change in electric charge and a change in pressure at a specific point of the 3D glasses.

The controlling unit may control an image being displayed in the 3D image mode to be displayed in the 2D image mode if a second signal generated by the 3D glasses is received.

According to an aspect of another exemplary embodiment, there is provided a method for providing a 3D image in a display apparatus which interworks with 3D glasses, the method including: inputting an image; displaying the input image in a 2D image mode; receiving a first signal generated by the 3D glasses from the 3D glasses; and determining a format of the input image if the first signal is received, and converting the 2D image mode in which the input image is being displayed to a 3D image mode according to the determined format and displaying the image.

The method may further include displaying a GUI including a plurality of 3D image format items from which the format of the input image is selected.

The method may further include highlighting and displaying the selected 3D image format item from among the plurality of format items displayed in the GUI.

The 3D glasses may include a sensor which senses whether a user wears the 3D glasses and may generate the first signal if the sensor senses that the user wears the 3D glasses.

The sensor may sense whether the user wears the 3D glasses according to at least one of a change in electric charge and a change in pressure at a specific point of the 3D glasses.

The method may further include displaying the input image currently being displayed in the 3D image mode in the 2D image mode if a second signal generated by the 3D glasses is received.

According to an aspect of another exemplary embodiment, there is provided a system which provides a 3D image, the system including: 3D glasses which generate a first signal if a sensor senses that a user wears the 3D glasses and which transmit the generated first signal; and a display apparatus which determines a format of the input image if the first signal is received and which displays an image currently being displayed in a 2D image mode in a 3D image mode according to the determined format.

The 3D glasses may further include a glasses unit to open and close left eye glasses and right eye glasses alternately based on a synchronization signal output from the display apparatus, and the glasses unit may have curved surface so that a user's gaze forms a right angle with the glasses line of the glasses unit.

According to an aspect of another exemplary embodiment, there is provided a method for providing a 3D image in a display apparatus which interworks with 3D glasses, the method including: receiving a first signal generated by the 3D glasses from the 3D glasses; and controlling an input image being displayed in a first image mode, from among a 2D image mode and a 3D image mode, to be displayed in a second image mode different from the first image mode, from among the 2D image mode and the 3D image mode, in response to the received first signal.

According to an aspect of another exemplary embodiment, there is provided 3D glasses to view a 3D image displayed on a display apparatus, the 3D glasses including: a sensor which senses whether a user wears the 3D glasses; and a control unit which generates a first signal in response to the sensor sensing that the user wears the 3D glasses, and which transmits the generated first signal to the display apparatus to control the display apparatus to display the 3D image.

DETAILED DESCRIPTION OF EXEMPLARY EMBODIMENTS

Figure 1:
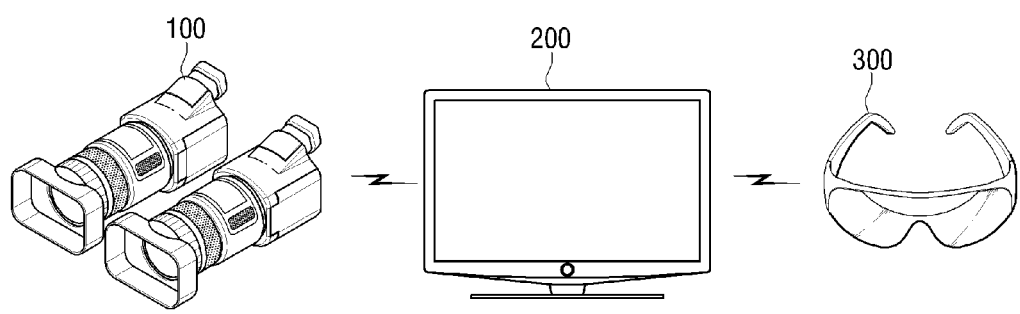
FIG. 1 is a view illustrating a three-dimensional (3D) image providing system according to an exemplary embodiment.

Reference will now be made in detail to exemplary embodiments, examples of which are illustrated in the accompanying drawings, wherein like reference numerals refer to like elements throughout. Exemplary embodiments are described below with reference to the figures. Expressions such as "at least one of," when preceding a list of elements, modify the entire list of elements and do not modify the individual elements of the list.

FIG. 1 is a view illustrating a three-dimensional (3D) image providing system according to an exemplary embodiment. As illustrated in FIG. 1, the 3D image providing system includes a camera 100 which generates a 3D image, a television (TV) 200 which displays a 3D image on a screen, and shutter glasses 300 to view the displayed 3D image.

The camera 100 is a type of photographing apparatus which generates the 3D image. In particular, the camera 100 generates a left eye image photographed to be provided to a left eye of a user, and a right eye image photographed to be provided to a right eye of the user. That is, the 3D image includes a left eye image and a right eye image, and as the left eye image and the right eye image are alternately provided to the left eye and the right eye of the user, a stereoscopic sense occurs due to binocular disparity.

To this end, the camera 100 includes a left eye camera or lens which generates the left eye image and a right eye camera or lens which generates the right eye image, and a distance between the left eye camera or lens and the right eye camera or lens is determined based on a distance between the left eye and the right eye of the user.

The camera 100 transmits the photographed left eye image and the right eye image to the TV 200. To be more specific, the camera 100 may transmit the left eye image and the right eye image in the format of a frame including only one of the left eye image and the right eye image, or in the format of a frame including both the left eye image and the right eye image.

For example, the camera 100 predetermines one from among various 3D image formats, generates the 3D image according to the predetermined format, and transmits the generated 3D image to the TV 200.

Hereinbelow, some formats of a 3D image transmitted to the TV 200 will be explained with reference to FIGS. 2A to 2F. FIGS. 2A to 2F are views provided to explain formats of a 3D image according to one or more exemplary embodiments. In FIGS. 2A to 2F, the left eye image is displayed in white and the right eye image is displayed in black for convenience of explanation.

Figure 2A:
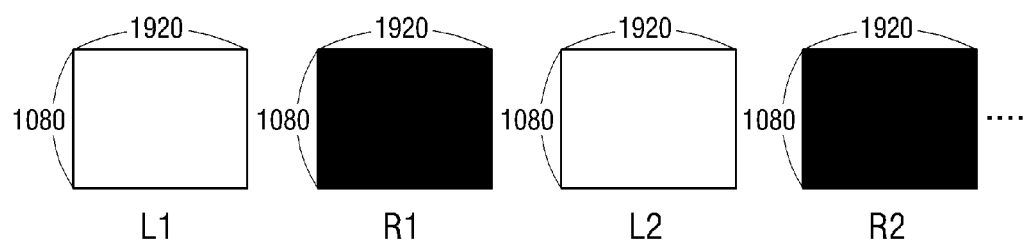
FIGS. 2A to 2F are views provided to explain a format of a 3D image according to one or more exemplary embodiments.

FIG. 2A illustrates a 3D image format which follows a general frame sequence method according to an exemplary embodiment. According to the frame sequence method, only one of the left eye image and the right eye image is included in a single frame.

Figure 2B:
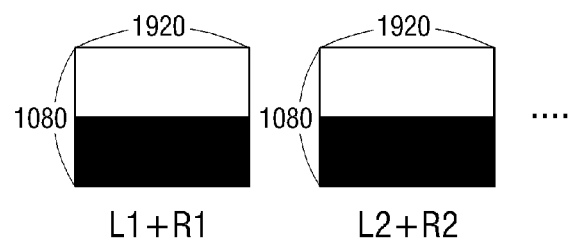

FIG. 2B illustrates a 3D image format which follows a top-bottom method according to an exemplary embodiment, in which both of the left eye image and the right eye image are included in a single frame. In particular, according to the top-bottom method, the left eye image and the right eye image are separated vertically with the left eye image in the upper side and the right eye image in the lower side, though it is understood that another exemplary embodiment is not limited thereto. For example, according to another exemplary embodiment, the left eye image is in the lower side and the right eye image is in the upper side of the frame.

Figure 2C:
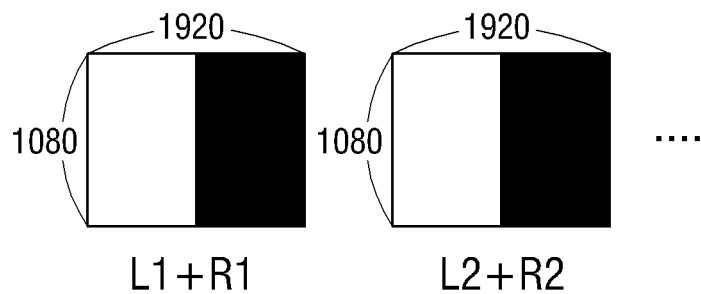

FIG. 2C illustrates a 3D image format which follows a side-by-side method according to an exemplary embodiment. According to the side-by-side method, both of the left eye image and the right eye image are included in a single frame. In particular, according to the side-by-side method, the left eye image and the right eye image are separated horizontally with the left eye image in the left side and the right eye image in the right side, though it is understood that another exemplary embodiment is not limited thereto. For example, according to another exemplary embodiment, the left eye image is in the right side and the right eye image is in the left side of the frame.

Figure 2D:
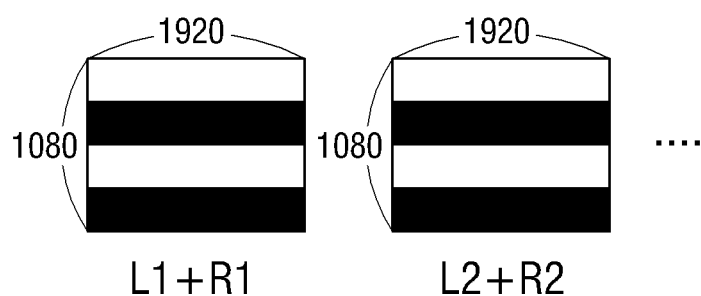

FIG. 2D illustrates a 3D image format which follows a horizontal interleave method according to an exemplary embodiment. According to the horizontal interleave method, both of the left eye image and the right eye image are included in a single frame. In particular, according to the horizontal interleave method, the left eye image and the right eye image are disposed alternately by row.

Figure 2E:
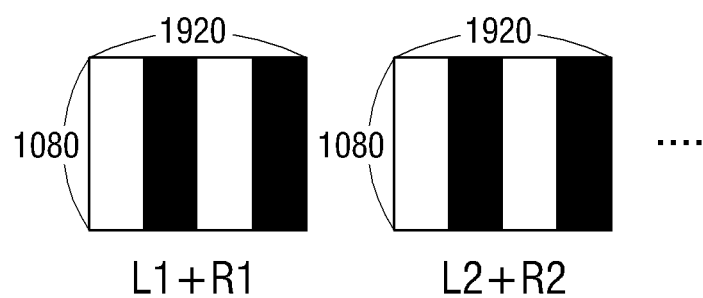

FIG. 2E illustrates a 3D image format which follows a vertical interleave method according to an exemplary embodiment. According to the vertical interleave method, both of the left eye image and the right eye image are included in a single frame. In particular, according to the vertical interleave method, the left eye image and the right eye image are disposed alternately by column.

Figure 2F:
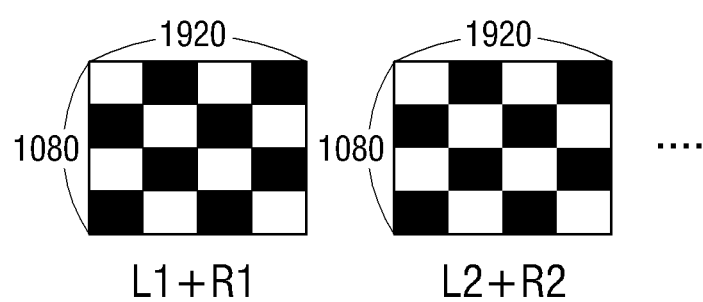

FIG. 2F illustrates a 3D image format which follows a checker board method according to an exemplary embodiment. According to the checker board method, both of the left eye image and the right eye image are included in a single frame. In particular, according to the checker board method, the left eye image and the right eye image are disposed alternately by pixel or by a group of pixels.

Referring back to FIG. 1, the camera 100 determines a format from among, for example, the aforementioned formats, generates a 3D image based on the determined format, and transmits the generated 3D image to the TV 200.

The TV 200 is a type of display apparatus which receives the 3D image directly from a photographing apparatus such as the camera 100, from a broadcasting station where the 3D image has been transmitted to for editing/processing, from a reproducing apparatus, etc. Furthermore, the TV 200 processes the received 3D image and displays the processed 3D image on the screen. In particular, the TV 200 processes the left eye image and the right eye image taking into account the format of the 3D image, and enables the processed left eye image and the right eye image to be alternately displayed in a timesharing manner.

Furthermore, the TV 200 generates a synchronization signal synchronized with the timing of the left eye image or the right eye image being displayed on the screen in a timesharing manner, and transmits the generated synchronization signal to the 3D glasses 300.

Figure 3:
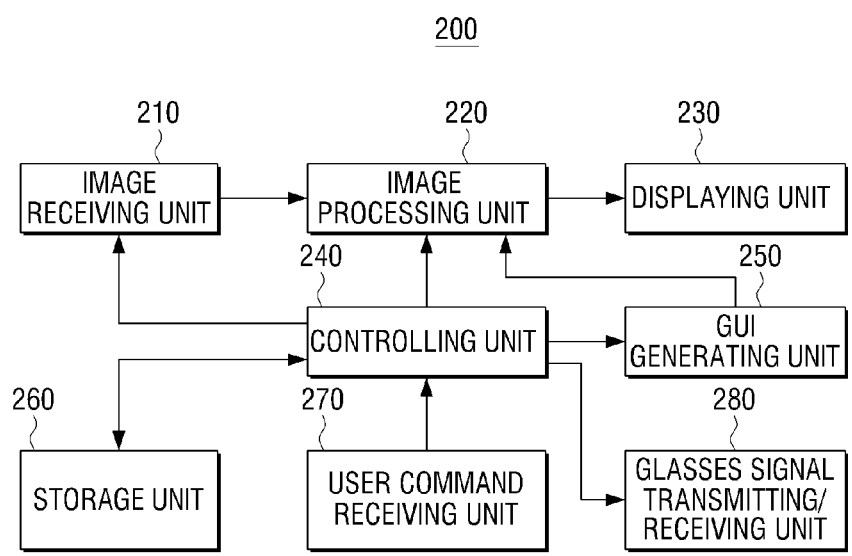
FIG. 3 is a block diagram of a television (TV) according to an exemplary embodiment.

A detailed structure of the TV 200 according to an exemplary embodiment may be better understood with reference to FIG. 3. FIG. 3 is a block diagram of a TV 200 according to an exemplary embodiment.

As illustrated in FIG. 3, the TV 200 includes an image receiving unit 210, an image processing unit 220, a displaying unit 230, a controlling unit 240, a graphical user interface (GUI) generating unit 250, a storage unit 260, a user command receiving unit 270, and glasses signal transmitting/receiving unit 280.

The image receiving unit 210 receives a broadcast transmitted wirelessly or via cables from a broadcasting station or a satellite, and demodulates the broadcast. The image receiving unit 210 may be connected to an external device such as a camera 100 or a reproducing apparatus, and receives a 3D image therefrom. The external device may be connected wirelessly or via cables through an interface such as S-Video, Component, Composite, D-Sub, DVI, and HDMI.

As described above, the 3D image is an image in the format of at least one frame including either one of or both the left eye image and the right eye image. That is, the 3D image is an image generated according to one of various 3D formats.

Therefore, the 3D image transmitted to the image receiving unit 210 may be in various formats. For example, the 3D image can be in one of a general frame sequence method, a top-bottom method, a side by side method, a horizontal interleave method, a vertical interleave method, and a checker board method. The image receiving unit 210 transmits the received 3D image to the image processing unit 220.

The image processing unit 220 performs operations of processing signals and adding GUIs such as video decoding, format analyzing, and video scaling on the received 3D image.

In particular, the image processing unit 220 generates a left eye image and a right eye image, each of which fits the size of a screen (e.g., 1920×1080), using the format of the 3D image transmitted to the image receiving unit 210.

That is, in the case when the format of the 3D image is any one of a top-bottom method, a side by side method, a horizontal interleave method, a vertical interleave method, or a checker board method, the image processing unit 220 extracts the left eye image portion and the right eye image portion from each image frame, and upscales or interpolates the extracted left eye image and the right eye image, thereby generating a left eye image and a right eye image to be provided to the user.

In the case when the format of the 3D image is in a general frame sequence method, the image processing unit 220 extracts the left eye image or the right eye image from each frame and processes the images to be provided to the user.

Furthermore, the image processing unit 220 enables a GUI received from the GUI generating unit 250 which will be explained below to be added to either of or both the left eye image and right eye image.

The image processing unit 220 alternately transmits the extracted left eye image and the right eye image in a timesharing manner to the displaying unit 230. For example, the image processing unit 220 transmits the left eye image and the right image to the image output unit 230 in the following order: first left eye image (L1)→first right eye image (R1) →second left eye image (L2)→second right eye image (R2)→ . . . .

The displaying unit 230 alternately outputs the left eye image and the right eye image transmitted from the image processing unit 220, to be provided to the user.

The GUI generating unit 250 generates a GUI to be shown on a display. The GUI generated by the GUI generating unit 250 is applied to the image processing unit 220 and added to either of or both the left eye image and the right eye image to be shown on the display.

Figure 5:
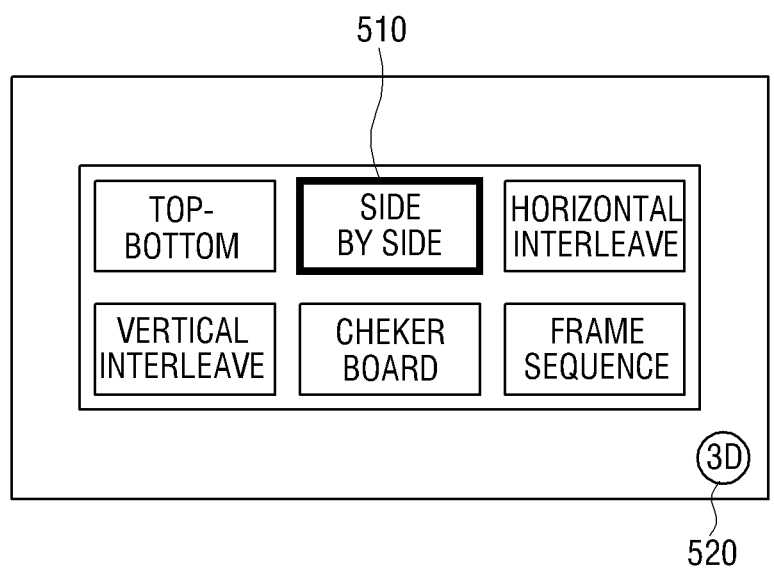
FIG. 5 is a view provided to explain a graphical user interface (GUI) including a plurality of 3D image formats according to an exemplary embodiment.

In response to an operation signal being received from the 3D glasses 300, the GUI generating unit 250 may generate GUIs including a plurality of formats through the controlling unit 240 which will be explained below. Specifically, as illustrated in FIG. 5, the GUI generating unit 250 generates a GUI including the aforementioned plurality of formats (such as frame sequence, top-bottom, and side-by-side) so that a user may select a format for the 3D image.

The storage unit 260 is a storage medium which stores various programs to operate the TV 200. The storage unit 260 may be external or internal, and may be a volatile memory (such as RAM) or a non-volatile memory (such as ROM, flash memory, or a hard disk drive).

The user command receiving unit 270 receives a user command from an input device such as a remote controller and transmits the received user command to the controlling unit 240.

The glasses signal transmitting/receiving unit 280 generates a synchronization signal synchronized with the left eye image and the right eye image alternately output, and transmits the generated synchronization signal to 3D glasses 300 in the form of an infrared ray. It is understood that another exemplary embodiment is not limited to the infrared ray, and may transmit the synchronization signal in a different wireless communication format (such as Bluetooth). This is, displaying unit 230 is enabled to display the left eye image during the period when the left eye of the 3D glasses 300 is open and to display the right eye image during the period when the right eye glass of the 3D glasses is open by synchronizing the TV 200 and the 3D glasses 300 as the 3D glasses 300 opens and closes alternately.

The glasses signal transmitting/receiving unit 280 receives operation and stop signals from the 3D glasses 300. The operation signal is generated when the 3D glasses 300 sense that a user wears the 3D glasses 300. The stop signal is generated when the 3D glasses 300 sense that the user takes off the 3D glasses.

Whether a user wears the 3D glasses 300 may be sensed by a sensor attached to the 3D glasses 300. For example, the 3D glasses 300 may include at least one of a magnetic sensor and a pressure sensor at a portion which is contacted by a user's nose or ear. The magnetic sensor may sense if the user wears the 3D glasses 300 by sensing the change in electric charge. The pressure sensor may sense if the user wears the 3D glasses 300 by sensing the change in pressure.

The controlling unit 240 controls overall operations of the TV 200 according to the user command received from the user command receiving unit 270. In particular, the controlling unit 240 controls the image receiving unit 210 and the image processing unit 220 so that the 3D image can be received, the received 3D image can be separated into the left eye image and the right eye image, and each of the separated left eye image and the right eye image can be scaled or interpolated to fit one screen.

In addition, the controlling unit 240 controls the glasses signal transmitting/receiving unit 280 to generate and transmit the synchronization signal synchronized with the output timing of the left eye image and the right timing image.

Once an operation signal is received from the 3D glasses 300, the controlling unit 240 determines the format of the input 3D image. For example, if 3D image information is included with the input 3D image, the controlling unit 240 extracts the 3D image information to determine the format of the 3D image. If 3D image information is not included with the input 3D image, the controlling unit 240 determines the format of the 3D image by comparing the left eye image with the right eye image of the input 3D image.

In addition, once an operation signal is received from the 3D glasses 300, the controlling unit 240 controls the 3D image which is currently being displayed in a 2D image mode to be displayed in a 3D image mode. Specifically, if the operation signal is received from the 3D glasses 300, the controlling unit 240 automatically determines the format of the received 3D image and controls the 3D image which is currently being displayed in a 2D image mode to be displayed according to the determined 3D image mode.

Additionally, if the operation signal is received from the 3D glasses 300, the controlling unit 240 may display a GUI including a plurality of 3D image formats so that a user may select the format of the input 3D image. For example, if 3D image information is not included with the input 3D image, the controlling unit 240 may determine the format of the 3D image by comparing the left eye image and the right eye image. However, this may lead to an incorrect determination. Accordingly, the controlling unit 240 may generate a GUI including a plurality of 3D image formats so that a user may select the format of the 3D image. In this case, the controlling unit 240 may control the determined format from among the plurality of formats to be highlighted.

Alternatively, if a stop signal is received from the 3D glasses 300, the controlling unit 240 controls the 3D image currently being displayed in a 3D image mode to be displayed in a 2D image mode.

Meanwhile, the 3D glasses 300 open and close a left eye glass and a right eye glass alternately according to the synchronization signal received from the TV 200, enabling the user to watch the left eye image and the right eye image through the left eye and the right eye, respectively.

The 3D glasses 300 include at least one sensor (not shown) which may be a magnetic sensor or a pressure sensor. The sensor may be disposed in a place in which the 3D glasses 300 contacts a certain body part of a user. For example, the sensor may be disposed in a place where the 3D glasses 300 contact a nose or an ear of the user. The 3D glasses 300 may include only one of the magnetic sensor and the pressure sensor, or may include both the magnetic sensor and the pressure sensor to enhance sensing accuracy.

The 3D glasses 300 may sense whether the user wears the 3D glasses 300 using the sensor. Specifically, if the user wears the 3D glasses 300, the magnetic sensor may perceive such wearing by sensing a change of magnetic charge, and the pressure sensor may perceive such wearing by sensing a change in pressure.

Once the sensor perceives that the user wears the 3D glasses 300, the 3D glasses generate an operation signal and transmit the operation signal to the TV 200. For example, the operation signal may be transmitted to the TV in the form of wireless IR or radio frequency (RF). If the TV 200 receives the operation signal, the TV 200 displays the 3D image currently being displayed in a 2D image mode in a 3D image mode according to the determined format.

If the sensor perceives that the user takes off the 3D glasses, the 3D glasses 300 generate a stop signal and transmits the generated stop signal to the TV 200. The stop signal may also be transmitted to the TV in the form of wireless IR or RF. If the TV 200 receives the stop signal, the TV 200 displays the 3D image currently being displayed in a 3D image mode in a 2D image mode.

Figure 6:
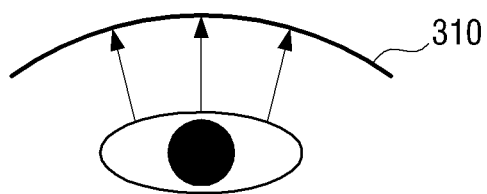
FIG. 6 is a view illustrating 3D glasses according to an exemplary embodiment.

The glasses unit 310 of the 3D glasses 300 may have a curved surface. Specifically, the glasses unit 310 of the 3D glasses 300 may have a curved surface as illustrated in FIG. 6 so that the user's gaze forms a right angle with the glasses line of the glasses unit 310. Accordingly, no matter where the user's eyes gaze at, the user's gaze forms a right angle with the glasses unit 310. Thus, the user may experience less eye fatigue while watching the 3D image.

Figure 4:
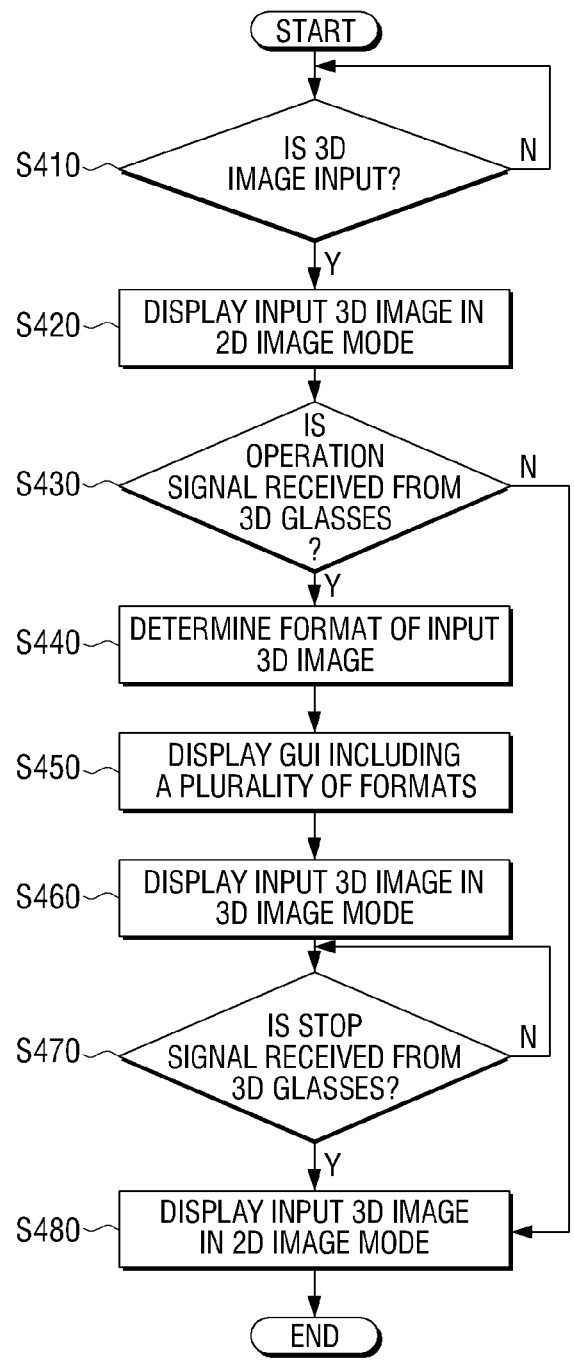
FIG. 4 is a flowchart provided to explain a method for providing a 3D image according to an exemplary embodiment.

A method for providing a 3D image by receiving an operation signal and a stop signal from 3D glasses 300 according to an exemplary embodiment will be explained below with reference to FIG. 4. FIG. 4 is a flowchart provided to explain a method for providing a 3D image according to an exemplary embodiment.

Referring to FIG. 4, a TV 200 determines whether a 3D image is input (S410).

If it is determined that the 3D image is input (S410—Y), the TV 200 displays the input 3D image in a 2D image mode (S420). The 2D image mode refers to a mode in which only one of the left eye image and the right eye image of the 3D image is displayed so that the 3D image is displayed as a 2D image. In this case, the TV 200 has not received an operation signal from 3D glasses 300.

While the input 3D image is being displayed in the 2D image mode, the TV 200 determines whether the operation signal is received from the 3D glasses 300 (S430).

If the TV 200 receives the operation signal from the 3D glasses (S430—Y), the TV 200 determines the format of the input 3D image (S440). Specifically, the 3D glasses 300 generate and transmit the operation signal as described below.

The 3D glasses 300 includes at least one sensor (not shown) which may be a magnetic sensor or a pressure sensor. The sensor may be disposed in a place in which the 3D glasses 300 contacts a certain body part (such as a nose or an ear) of a user. The 3D glasses 300 may sense whether the user wears the 3D glasses 300 using the at least one sensor. Specifically, if the user wears the 3D glasses 300, the magnetic sensor may perceive such wearing by sensing a change of magnetic charge, and the pressure sensor may perceive such wearing by sensing a change in pressure.

Once the sensor perceives that the user wears the 3D glasses 300, the 3D glasses 300 generate an operation signal and transmit the generated operation signal to the TV 200. The operation signal may be transmitted to the TV in the form of wireless IR or RF. If the TV 200 receives the operation signal, the TV 200 displays the 3D image currently being displayed in a 2D image mode in a 3D image mode according to the determined format.

The format of the 3D image may be determined a number of ways. For example, if 3D image information regarding the input 3D image is included with the input 3D image, the TV 200 extracts the 3D image information to determine the format of the 3D image. If 3D image information is not included with the input 3D image, the TV 200 may determine the format of the 3D image by comparing the left eye image with the right eye image of the input 3D image.

Once the format of the 3D image is determined, the TV 200 may display a GUI including a plurality of selectable formats (S450). Specifically, the TV 200 may display a GUI including the aforementioned plurality of formats so that the user may select a format for the input 3D image. In this case, as illustrated in FIG. 5, the TV 200 may highlight and display the determined 3D image format from among the plurality of formats in the GUI. For example, if the determined format of the input 3D image is side-by-side, the TV 200 may highlight the side-by-side item in the GUI. Additionally, in order for the user to easily recognize that the current mode is a 3D mode, a GUI item 520 indicating that the current mode is the 3D image mode may be displayed. Accordingly, the user may select the format of the input 3D image and confirm that the current mode is the 3D image mode more easily and conveniently. In another exemplary embodiment, the TV 200 may directly display the 3D image input in a 3D image mode according to the determined format without performing operation S450.

The TV 200 displays the input 3D image in a 3D image mode according to the format selected by a user or the format determined automatically (S460). The 3D image mode refers to a mode which provides a stereoscopic image by alternately displaying the left eye image and the right eye image of the 3D image.

While the input 3D image is being displayed in the 3D image mode, the TV 200 determines whether a stop signal is received from the 3D glasses 300 (S470). If the stop signal is received from the 3D glasses 300 (S470—Y), the TV 200 displays the input 3D image in a 2D image mode again (S480). The stop signal is generated when the 3D glasses 300 sense that the user takes off the 3D glasses 300 using the aforementioned at least one sensor.

If the TV 200 does not receive the operation signal from the 3D glasses 300 in the step S430, the TV 200 continues displaying the input 3D image in the 2D image mode (S480).

As described above, when the user wears the 3D glasses 300, the 3D glasses 300 generate the operation signal and transmit the generated operation signal to the TV 200. If the TV 200 receives the operation signal, the TV 200 automatically determines the format of the input 3D image and displays the 3D image in a 3D image mode according to the determined format. Accordingly, the 3D image is displayed in the 3D image mode when the user wears the 3D glasses 300, and thus the user may watch the 3D image more easily and conveniently.

In the above exemplary embodiments, the display apparatus is the TV 200, though it is understood that another exemplary embodiment is not limited thereto. The display apparatus could be any device which displays a 3D image, such as a 3D monitor and a 3D image projector, or which processes a 3D image to be displayed, such as a set-top box.

Furthermore, in the above-described exemplary embodiments, the sensor of the 3D glasses 300 is a magnetic sensor or a pressure sensor, though it is understood that another exemplary embodiment is not limited thereto. The sensor could be any sensor which may sense whether a user wears glasses, such as an acceleration sensor and a gyro sensor.

As described above, according to various exemplary embodiments, a display apparatus senses whether a user wears 3D glasses, and converts an image mode to a 3D image mode accordingly, and determines a format of the 3D image automatically. Accordingly, the user may watch the 3D image more easily and conveniently.

While not restricted thereto, exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, exemplary embodiments may be written as computer programs transmitted over a computer-readable transmission medium, such as a carrier wave, and received and implemented in general-use or special-purpose digital computers that execute the programs. Moreover, while not required in all aspects, one or more units of the TV 200 or 3D glasses 300 can include a processor or microprocessor executing a computer program stored in a computer-readable medium, such as a local storage.

Although a few exemplary embodiments have been shown and described, it would be appreciated by those skilled in the art that changes may be made in the exemplary embodiments without departing from the principles and spirit of the inventive concept, the scope of which is defined in the claims and their equivalents.

What is claimed is:

1. A display apparatus interworking with three-dimensional (3D) glasses, the display apparatus comprising:
   an image input unit through which an image is input;
   a display unit which displays the input image in a 2D image mode or a 3D image mode;
   a glasses signal transmitting/receiving unit which receives a first signal generated by the 3D glasses from the 3D glasses; and
   a controlling unit which determines a format of the input image in response to the received first signal, and controls the input image being displayed in the 2D image mode to be displayed in the 3D image mode according to the determined format,
   wherein the controlling unit controls the image input unit so that a graphical user interface (GUI) comprising a plurality of selectable 3D image format items for selecting by a user the format of the input image is displayed in response to the received first signal.

2. The display apparatus according to claim 1, wherein the controlling unit determines the format of the input 3D image automatically in response to the received first signal, and highlights and displays a selectable 3D image format item corresponding to the automatically determined 3D image format from among the plurality of selectable 3D image format items.

3. The display apparatus according to claim 1, wherein the 3D glasses comprises a sensor which senses whether a user wears the 3D glasses and generates the first signal in response to the sensor sensing that the user wears the 3D glasses.

4. The display apparatus according to claim 3, wherein the sensor senses whether the user wears the 3D glasses according to at least one of a change in electric charge and a change in pressure at a specific point of the 3D glasses.

5. The display apparatus according to claim 1, wherein the controlling unit controls the input image being displayed in the 3D image mode to be displayed in the 2D image mode in response to the glasses signal transmitting/receiving unit receiving a second signal generated by the 3D glasses.

6. The display apparatus according to claim 1, wherein the controller determines the format of the input 3D image from format information included with the input image.

7. A method for providing a three-dimensional (3D) image in a display apparatus which interworks with 3D glasses, the method comprising:
   inputting an image;
   displaying the input image in a two-dimensional (2D) image mode;
   receiving a first signal generated by the 3D glasses from the 3D glasses; and
   determining a format of the input image in response to the received first signal,
   displaying a graphical user interface (GUI) comprising a plurality of selectable 3D image format items from which the format of the input image is selected by a user, and converting the input image from the 2D image mode to a 3D image mode according to the determined format, and displaying the input image in the 3D image mode according to the determined format.

8. The method according to claim 7, further comprising:
   highlighting and displaying the selected 3D image format item from among the plurality of 3D image format items displayed in the GUI.

9. The method according to claim 8, wherein the 3D glasses comprise a sensor which senses whether a user wears the 3D glasses and generates the first signal in response to the sensor sensing that the user wears the 3D glasses.

10. The method according to claim 9, wherein the sensor senses whether the user wears the 3D glasses according to at least one of a change in electric charge and a change in pressure at a specific point of the 3D glasses.

11. The method according to claim 8, further comprising:
    displaying the input image currently being displayed in the 3D image mode in the 2D image mode in response to receiving a second signal generated by the 3D glasses.

12. A system which provides a three-dimensional (3D) image, the system comprising:
    3D glasses which generates a first signal in response to a sensor sensing that a user wears the 3D glasses, and which transmits the generated first signal; and
    a display apparatus which determines a format of an input image in response to receiving the first signal and which displays the input image currently being displayed in a two-dimensional (2D) image mode in a 3D image mode according to the determined format,
    wherein the display apparatus displays a graphical user interface (GUI) comprising a plurality of selectable 3D image format items for selecting by a user the format of the input image in response to the received first signal.

13. The system according to claim 12, wherein:
    the 3D glasses comprises a glasses unit to open and close left eye glasses and right eye glasses alternately based on a synchronization signal output from the display apparatus; and
    the glasses unit comprises a curved surface which enables a user's gaze to form a right angle with the glasses unit while viewing the displayed input image.

14. A method for providing a three-dimensional (3D) image in a display apparatus which interworks with 3D glasses, the method comprising:
    receiving a first signal generated by the 3D glasses from the 3D glasses; and
    controlling an input image being displayed in a first image mode, from among a two-dimensional (2D) image mode and a 3D image mode, to be displayed in a second image mode different from the first image mode, from among the 2D image mode and the 3D image mode, in response to the received first signal,
    wherein the controlling comprises displaying a graphical user interface (GUI) comprising a plurality of selectable 3D image format items for selecting by a user the format of the input image in response to the received first signal.

15. The method according to claim 14, further comprising:
    receiving a second signal generated by the 3D glasses from the 3D glasses; and
    controlling the input image being displayed in the second image mode to be displayed in the first image mode in response to the received second signal.

16. Three-dimensional (3D) glasses to view a 3D image displayed on a display apparatus, the 3D glasses comprising:
    a sensor which senses whether a user wears the 3D glasses; and
    a control unit which generates a first signal in response to the sensor sensing that the user wears the 3D glasses, and which transmits the generated first signal to the display apparatus to control the display apparatus to display the 3D image,
    wherein the display apparatus displays a graphical user interface (GUI) comprising a plurality of selectable 3D image format items for selecting by a user the format of the input image in response to the received first signal.

17. A non-transitory computer readable recording medium having recorded thereon a program executable by a computer for performing the method of claim 7.

18. A non-transitory computer readable recording medium having recorded thereon a program executable by a computer for performing the method of claim 14.

* * * * *